US009749422B2

United States Patent
De Lemos et al.

(10) Patent No.: US 9,749,422 B2
(45) Date of Patent: Aug. 29, 2017

(54) METHOD AND SYSTEM FOR TELECOMMUNICATION DEVICE MONITORING

(71) Applicant: Unify GmbH & Co. KG, Munich (DE)

(72) Inventors: Ricardo L. De Lemos, Ithaca, NY (US); Gary Edward Mora, Boca Raton, FL (US); Jeffrey B. Cripe, Boynton Beach, FL (US)

(73) Assignee: Unify GmbH & Co. KG, Munich (DE)

( * ) Notice: Subject to any disclaimer, the term of this patent is extended or adjusted under 35 U.S.C. 154(b) by 278 days.

(21) Appl. No.: 14/561,299

(22) Filed: Dec. 5, 2014

(65) Prior Publication Data

US 2016/0164978 A1    Jun. 9, 2016

(51) Int. Cl.
*G06F 15/16* (2006.01)
*H04L 29/08* (2006.01)
*H04L 12/26* (2006.01)
*H04M 3/42* (2006.01)

(52) U.S. Cl.
CPC ........... *H04L 67/141* (2013.01); *H04L 43/12* (2013.01); *H04L 67/10* (2013.01); *H04M 3/42323* (2013.01)

(58) Field of Classification Search
CPC ....... H04L 67/141; H04L 67/10; H04L 43/12; H04M 3/42323
USPC ...................................................... 709/204
See application file for complete search history.

(56) References Cited

U.S. PATENT DOCUMENTS

| 7,561,673 | B2 * | 7/2009 | Wang ..................... G06Q 10/10 379/88.01 |
| 7,751,544 | B2 | 7/2010 | Rist et al. |
| 8,224,975 | B1 * | 7/2012 | Liu ..................... H04L 65/1069 709/217 |
| 2003/0079034 | A1 * | 4/2003 | Rist ................... H04M 3/42323 709/230 |
| 2005/0144505 | A1 | 6/2005 | Takeuchi et al. |
| 2005/0144621 | A1 * | 6/2005 | Millbery ................ H04L 67/34 719/310 |
| 2006/0070086 | A1 * | 3/2006 | Wang ..................... G06Q 10/10 719/320 |

(Continued)

OTHER PUBLICATIONS

Service for Computer Supported Telecommunications Applications (CSTA) Phase II Standard ECMA-269 $9^{th}$ Edition / Dec. 2011.*

(Continued)

*Primary Examiner* — Tauqir Hussain
(74) *Attorney, Agent, or Firm* — Buchanan Ingersoll & Rooney PC

(57) ABSTRACT

A communication system includes a switch device communicatively connected to terminal devices and a computer device. The computer device is configured to initiate a connection to the switch device and, after establishment of the communication connection, initiate a bulk start-up of device monitoring for devices to which the switch device is connected. In some embodiments, the bulk start-up of monitoring can be initiated by obtaining an identification of all relevant devices in a reply to a single request sent by the computer device to the switch device. In some embodiments, the computer device can also be configured to send a monitor stop request to the switch device to stop the monitoring of devices.

20 Claims, 4 Drawing Sheets

(56) References Cited

U.S. PATENT DOCUMENTS

2006/0101146 A1* 5/2006 Wang ................ H04L 29/06027
709/227
2006/0126654 A1 6/2006 Nilakantan et al.
2013/0185425 A1 7/2013 De Lemos et al.
2016/0182715 A1* 6/2016 Rist ................... H04M 3/42323
379/211.02

OTHER PUBLICATIONS

Application Session Services Standard ECMA-354 1$^{st}$ Edition / Jun. 2004.*
ECMA International, "Services for Computer Supported Telecommunications Applications (CSTA) Phase III" Standard ECMA-269 9th Edition/Dec. 2011.

* cited by examiner

METHOD AND SYSTEM FOR TELECOMMUNICATION DEVICE MONITORING

FIELD OF THE INVENTION

The present invention relates in general to the field of network communication. Specifically, the present invention provides a system and method for initiating the monitoring of devices and/or the cessation (e.g. termination or ending) of such monitoring.

BACKGROUND OF THE INVENTION

Networks connect electronic devices together and enable them to communicate with one another. The electronic devices may include terminal communication devices (e.g. smart phones, laptops, computers, tablets, etc.), servers, hosts (processing units such as computers, printers or other peripheral devices), controllers, switches, gateways, and other network elements. These electronic devices in the network communicate with each other through communication channels. Underlying these channels are various physical devices. Examples of the physical devices include adapters that connect various network elements to the network, a cable or a bus that connects the adapters to a port on a network hub, the network switches that provide connectivity to each network element and the cables or buses that interconnect these network switches.

U.S. Pat. No. 7,751,544 and U.S. Patent Application Publication Nos. 2003/0079034, 2005/0144505, 2006/0126654 and 2013/0185425 disclose examples of networks and network elements. ECMA International standard 269 discloses examples of methods by which different network elements may communicate with each other.

Monitoring of different network devices can occur in a network. For instance, under Computer Supported Telecommunications Applications (CSTA) standards, a computing function is often required to start individual device monitors for each device under its control. In many networks, compliance with the CSTA standards for performance of monitoring of different devices can involve significant network resources, which can add cost to the operation of the network and/or reduce the quality of network performance. For instance, in a large deployment, up to 100,000 service requests can be required to be made by a CSTA computing function and responses by a CSTA switching function to those requests may need to be processed in a serial fashion. Such a process can require pacing by the computing function and switching function in order to not overload the system with requests at the startup phase of monitoring.

SUMMARY OF THE INVENTION

A method of monitoring terminal devices can include the step of sending a first message from a first computer device to a switch device after a first communication link is established between the first computer device and the switch device. The first message can be configured (e.g. architected or designed) to start an application session. A second message can be sent from the switch device to the first computer device in response to the first message. A third message can be sent from the first computer device to the switch device after receipt of the second message. The third message can request an identification of all terminal devices of users connected to the switch device that is to be monitored by the first computer device. A fourth message can be sent from the switch device to the first computer device in response to the third message. The fourth message being configured (e.g. architected or designed) as a single message that identifies a list of all the terminal devices that the first computer device is to monitor. A monitor start message can be sent from the first computer device to the switch device in response to the fourth message to initiate device monitoring for all the terminal devices identified in the fourth message. Device monitoring for all of the terminal devices identified in the fourth message can then be activated at the switch device in response to the monitor start message such that call control events involving any of these terminal devices are communicated by the switch device to the first computer device after an acknowledgment of the monitor start message is sent to the first computer device.

Embodiments of the method can also include other steps. For instance, upon a determination that a call event has occurred for at least one of the terminal devices being monitored by the activated device monitoring, a call control event can be sent for the at least one terminal from the switch device to the first computer device. As another example, the activated device monitors can be associated with the first computer device, by the switch device, based on the application or service identified in the first message.

The first computer device can be a device that includes non-transitory memory, and a transceiver unit that are each connected to a processor unit. The first computer device can also include other elements such as at least one input device, at least one output device, an input/output device (e.g. a touch screen display), at least one receiver unit and at least one transmitter unit. In some embodiments, the first computer device can be a computer telephony integration server computer device.

The switch device can also include non-transitory memory, at least one transceiver unit, and a processor unit connected to the memory and the transceiver unit. For example, some embodiments of the switch device can be a private branch exchange, a soft switch, or other type of switch device.

The method can also include steps involving a second computer device and/or other additional computer devices communicating with the switch device for initiating monitoring of other applications or services. For instance, embodiments of the method can also include the step of sending an application start message from the second computer device to the switch device after a second communication link is established between the second computer device and the switch device, sending an application start response message from the switch device to the second computer device in response to the first message, and sending a request for switching function devices message from the second computer device to the switch device after receipt of the application start response message. The request for switching function devices message can request an identification of all terminal devices of users connected to the switch device that is to be monitored by the second computer device. Embodiments of the method can also include the steps of sending a single message identifying all the terminal devices to be monitored by the second computer device from the switch device to the second computer device in response to the request for switching function devices message and sending a monitor start message from the second computer device to the switch device in response to the single message identifying all the terminal devices to be monitored by the second computer device to initiate device monitoring for all the terminal devices identified in single message identifying all the terminal devices to be monitored by the second computer device. Device monitoring of all the terminal devices to be monitored by the second computer device can be activated at the switch device such that call control events involving any of these terminal devices are communicated by the switch device to the second computer device in response to the monitor start message.

Embodiments of the method can also include the steps of sending a single stop message from the first computer device to the switch device to stop device monitoring of all the terminal devices associated with the service and stopping device monitoring for all the terminal devices associated with the service at the switch device in response to receipt of the single stop message sent by the first computer device.

Communication systems can also be configured to implement an embodiment of the method. For example, a communication system can include a switch device configured to be communicatively connectable to a plurality of terminal devices and a first computer device communicatively connectable to the switch device via a first communication link. The first computer device can include hardware. The hardware can include non-transitory memory connected to a processor. The first computer device can be configured to initiate monitoring of a service provided to at least some of the terminal devices connectable to the switch device via a service request that is sent to the switch device to initiate device monitoring at the switch device for monitoring the terminal devices associated with the service to be monitored by the first computer device.

In some embodiments, the switch device is configured to send call control events to the first computer device for the terminal devices monitored via the initiated device monitoring.

The first computer device can also be configured to send a single stop message to the switch device to stop device monitoring of all the terminal devices associated with the service. The switch device can be configured to stop device monitoring for all the terminal devices associated with the service to be monitored in response to receipt of the single stop message sent by the first computer device. For instance, event reporting that may be activated by the switch device can be stopped in response to the single stop message that can be sent by the first computer device.

In some embodiments of the system, the first computer device can be configured to initiate monitoring of the service via a single service request that is sent to the switch device to obtain a response identifying all of the terminal devices to be monitored by the first computer device and, after receiving that response from the switch device, sending a single monitor start message to the switch device to start the monitoring of all the terminal devices identified by the switch device in that response such that the switch device initiates device monitoring for all of these terminal devices for communicating call control events relating to these terminal devices to the first computer device.

In some embodiments, the initiation of monitoring of the service provided to at least some of the terminal devices connectable to the switch device via the service request can be configured to occur in connection with an exchange of messages between the first computer device and the switch device. The exchange of messages can include, for example: the first computer device sending a first message to the switch device after the first communication link is established where the first message is configured to start an application session, the switch device sending a second message to the first computer device in response to the first message, the first computer device sending a third message to the switch device after receipt of the second message that requests an identification of all terminal devices of users connected to the switch device that is to be monitored by the first computer device, the switch device sending a fourth message to the first computer device in response to the third message that is configured as a single message that identifies a list of all the terminal devices that the first computer device is to monitor, the first computer device sending a monitor start message to the switch device in response to the fourth message to initiate device monitoring for all the terminal devices identified in the fourth message, the switch device acknowledging the monitor start message such that device monitoring of all the terminal devices identified in the fourth message is activated at the switch device so that call control events involving any of these terminal devices are communicated by the switch device to the first computer device after the acknowledging of the monitor start message is sent to the first computer device.

In some embodiments, the switch device can associate the device monitors with the first computer device based on the application or service identified in the first message. The switch device can also be configured to associate the first communication link with the device monitors activated in response to the monitor start message based on the first message.

In some embodiments, the communication system can include at least one other computer device for performing other monitoring. For instance, embodiments of the communication system can also include a second computer device communicatively connectable to the switch device via a second communication link established between the second computer device and the switch device. The second computer device can be configured to initiate monitoring of a service provided to at least some of the terminal devices connectable to the switch device via a service request that is sent to the switch device to initiate device monitoring at the switch device for monitoring the terminal devices associated with the service to be monitored by the second computer device. The initiation of monitoring of the service provided to at least some of the terminal devices connectable to the switch device via the service request sent by the second computer device can be configured to occur in connection with an exchange of messages between the second computer device and the switch device that comprise: the second computer device sending a first message to the switch device after the second communication link is established that is configured to start an application session, the switch device sending a second message to the second computer device in response to the first message, the second computer device sending a third message to the switch device after receipt of the second message that requests an identification of all terminal devices of users connected to the switch device that is to be monitored by the second computer device, the switch device sending a fourth message to the second computer device in response to the third message that is configured as a single message that identifies a list of all the terminal devices that the second computer device is to monitor, the second computer device sending a monitor start message to the switch device in response to the fourth message to initiate device monitoring for all the terminal devices identified in the fourth message, and the switch device acknowledging the monitor start message. Device monitoring of all the terminal devices identified in the fourth message sent to the second computer device can be activated at the switch device such that call control events involving any of these terminal devices are communicated by the switch device to the second computer device after the acknowledging of the monitor start message is sent from the switch device to the second computer device.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary devices, systems, and methods for providing and monitoring communications between multiple communication devices are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

Figure 1:
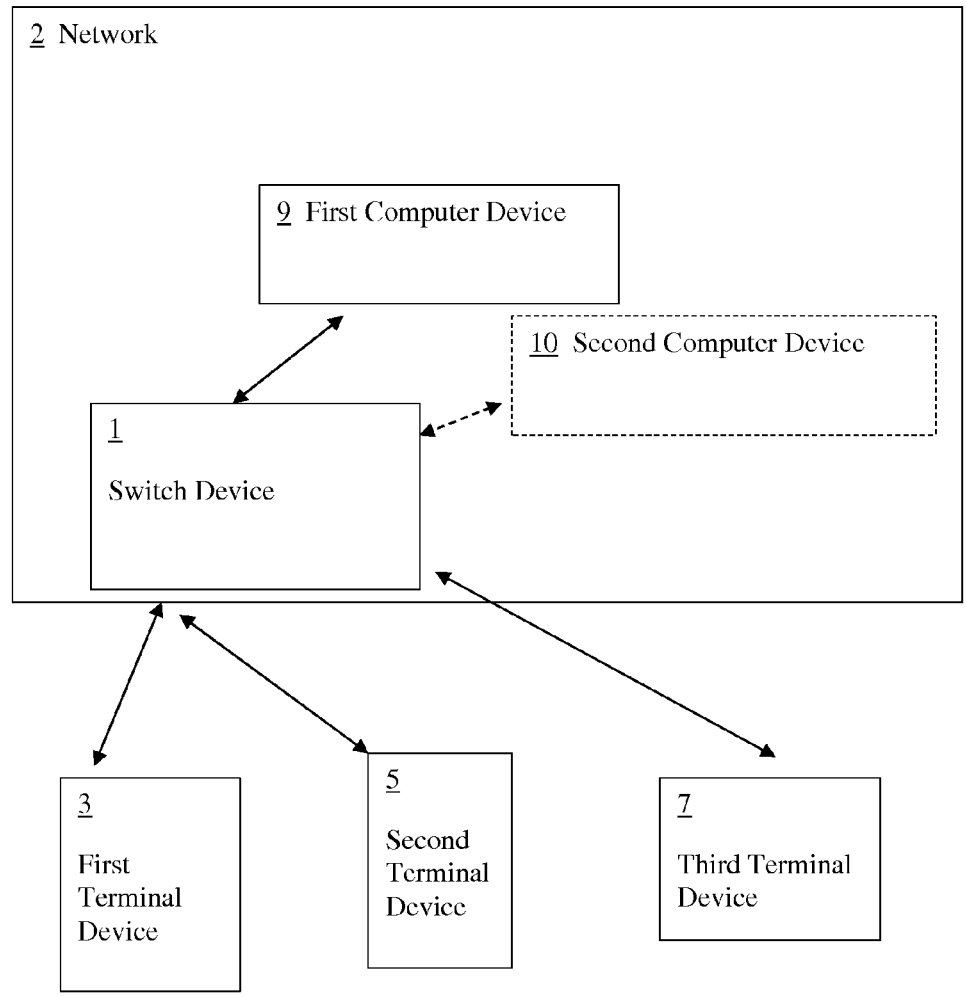
FIG. 1 is a block diagram of an exemplary embodiment of a communication system.
Figure 2:
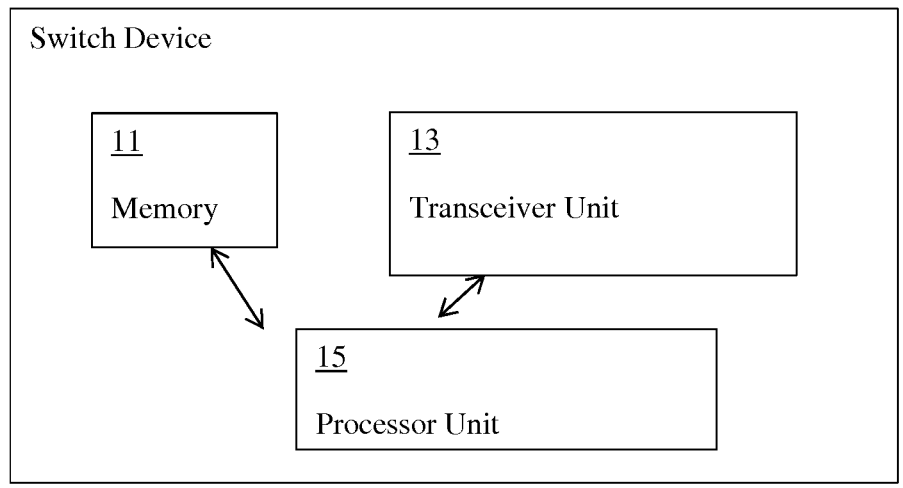
FIG. 2 is a block diagram of an exemplary embodiment of a switch device of the exemplary embodiment of the communication system.
Figure 3:
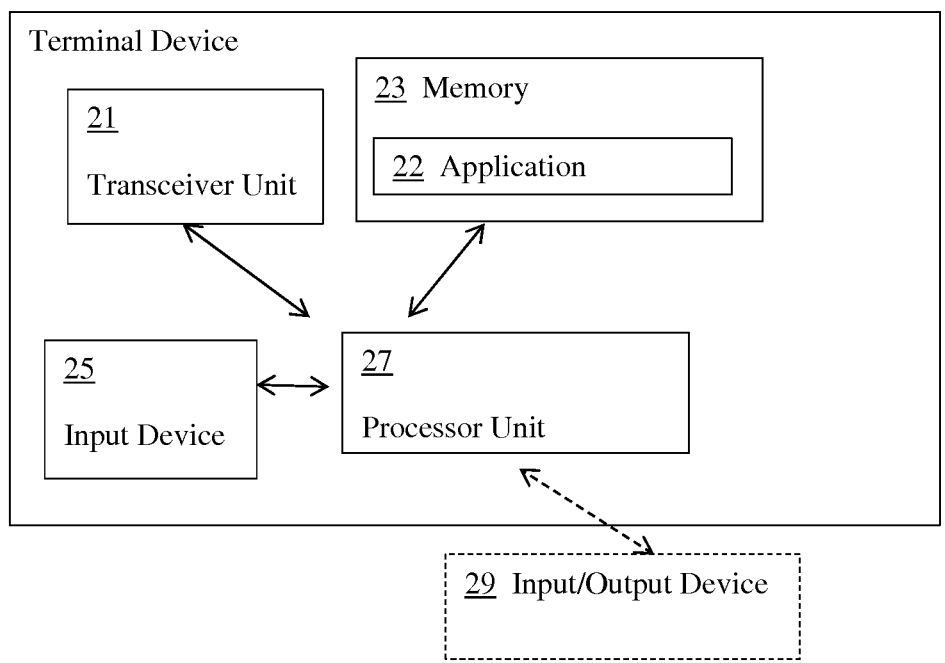
FIG. 3 is a block diagram of an exemplary embodiment of a terminal device of the exemplary embodiment of the communication system.
Figure 4:
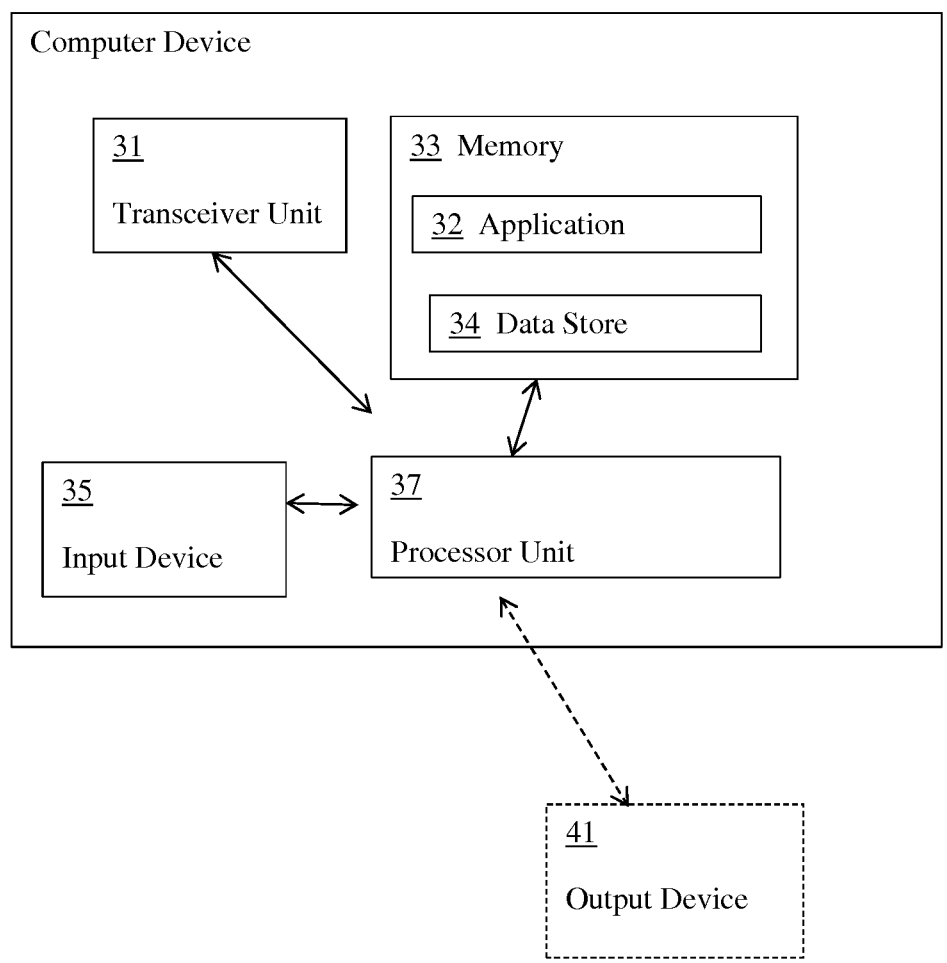
FIG. 4 is a block diagram of a computer device of the exemplary embodiment of the communication system.

Referring to FIGS. 1-5, a switch device 1 can be included within a network 2. A first computer device 9 can be communicatively connected to the switch device. In some embodiments, the switch device can be a branch exchange, such as a private branch exchange (PBX), or other type of switch device. In some embodiments, the first computer device 9 may be a server computer device such as a work station, a computer telephony integration (CTI) server computer device, or other server computer device. A second computer device 10 can also be communicatively connected to the switch device 1. The switch device 1 can be configured as a switching function under the CSTA standard and the first computer device 9 can be configured as a computing function under the CSTA standard. The second computer device 10 can also be configured as a computing function under the CSTA standard.

The switch device 1 can be communicatively connected to multiple terminal devices such as a first terminal device 3, a second terminal device 5, and a third terminal device 7. Each terminal device can be any type of communication endpoint such as a personal computer, a user device, a laptop computer, a tablet, a telephone, a cellular phone, a smart phone, or a personal digital assistant (PDA).

The network 2 can be configured as a corporate intranet, a local area network, a wide area network, or other type of network. The terminal devices connected to the switch device can be within the network 2 or may be outside of the network 2, but be communicatively connectable to the switch device 1 of the network 2. The network 2 can be connected to the internet or other networks as well. In some embodiments, the networks 2 can include other network elements such as one or more gateways, one or more access points, one or more network nodes, one or more database server computer devices, and/or one or more authentication servers.

The switch device 1 can include hardware. The hardware of the switch device 1 can include a processor unit 15 that is communicatively connected to non-transitory memory 11 and at least one transceiver unit 13. One or more applications or other type of software can be stored on the non-transitory memory 11. The one or more applications stored in the memory 11 can be executed by the processor unit 15 to cause the switch device to perform different types of functions. The processor unit 15 can be any type of hardware processor such as a central processing unit (CPU), interconnected microprocessors, one or more core processors, or other type of hardware processor. The memory 11 may be flash memory, a hard drive, or other type of non-transitory storage device for storing electronic data such as, for example, files, applications, and databases. The transceiver unit 13 can include at least one receiver and at least one transmitter.

Each terminal device can also include hardware. For instance, each terminal device can include a processor unit 27 that is communicatively connected to a transceiver unit 21, non-transitory memory 23, and at least one input device 25. The memory 23 can store one or more applications 22 that are executable by the processor 27. One or more input devices, output devices or at least one input/output device 29 can also be communicatively connected to the processor 27. For instance, a touch screen display, monitor, microphone, video camera, or other device can be communicatively connected to the processor 27. The processor unit 27 can be any type of hardware processor such as a CPU, interconnected microprocessors, one or more core processors, or other type of hardware processor. The memory 23 may be flash memory, a hard drive, or other type of non-transitory storage device for storing electronic data such as, for example, files, applications, and databases. The transceiver unit 21 can include at least one receiver and at least one transmitter. The input device 25 can be, for example, a button, keyboard, key pad, mouse, pointer, stylus, microphone, a touch screen device or a type of input/output device. Each input/output device 29 can include a touch screen device or other type of input/output device. An output device can include a speaker, a display, a printer, other type of output device or a type of input/output device.

The first computer device 9 and second computer device 10 can each have hardware that includes non-transitory memory 33, a transceiver unit 31, and at least one input device 35 that is communicatively connected to a processor unit 37. The memory 33 can store at least one application 32 that is executable by the processor unit 37 and at least one database or other type of data store 34. At least one output device 41 or input/output device can also be connected to the computer device. The processor unit 37 can be any type of hardware processor such as a CPU, interconnected microprocessors, one or more core processors, or other type of hardware processor. The memory 33 may be flash memory, a hard drive, or other type of non-transitory storage device for storing electronic data such as, for example, files, applications, and databases. The transceiver unit 31 can include at least one receiver and at least one transmitter. Each input device 35 can be, for example, a button, keyboard, key pad, mouse, pointer, stylus, microphone, touch screen device or other type of input device or input/output device. The output device 41 can be a speaker, a display, a printer, other type of output device or a type of input/output device.

The switch device 1 can be configured to classify all terminal devices in the communication system that have been enabled for implicit device monitoring for a pre-configured computer device (e.g. the first computer device 9 and/or second computer device 10). The device classification can be used to identify the type of users of the terminal devices that the computer device wishes to monitor (e.g. all terminal devices associated with users within a specific tenant group or users specifically licensed for services provided by the computer device). The switch device 1 can communicate with the first computer device 9 and/or second computer device 10 to associate each implicit device monitor with a trusted connection to a computer device.

The first computer device 9 can be configured to establish a communication connection with the switch device 1 to perform monitoring of terminal devices and functions of the network that the terminal devices may utilize via the switch device 1. After establishment of a communication link between the switch device 1 and the first computer device 9 (e.g. a first communication link), the first computer device 9 and switch device 1 may exchange messages to start an application and subsequently initiate first computer device monitoring. The communication link between the switch device 1 and the first computer device 9 may be, for example, a direct wired link, a direct wireless communication link, or a communication link that extends along a path that include multiple intermediate network nodes that may include wired transmission path segments and wireless transmission path segments.

After the communication link is established between the first computer device 9 and the switch device 1, the first computer device 9 may send a first message to the switch device 1 and the switch device 1 may respond to that first message by sending a second message. The first and second messages can be designed or architected based on the Application Session protocol to configure the use of the Application Session protocol for Application Session Services in compliance with CSTA standards. For instance, the first message can be configured (e.g. designed or architected) as a start application session request. The switch device 1 can send a response to that first message as the second message. The second message can be configured (e.g. designed or architected) as a start application session response. The first message can be configured (e.g. designed or architected) such that the switch device 1 associates a number of terminal devices that utilize the switching device's resources with the application initiated via the first message. For example, the first message can provide information to the switch device 1 so that the switch device is able to identify the application to associate with the first computer device 9 and identify devices that can be associated with the application. The second message sent by the switch device 1 can be configured (e.g. designed or architected) to acknowledge receipt of that first message and indicate that the switch device 1 is able to associate device monitoring for the terminal devices associated with that application and the link established between the first computer device 9 and the switch device 1.

The first computer device 9 can respond to the second message it receives from the switch device. After receiving the second message, the first computer device 9 can send a third message configured as a get switching function device message, which can be configured (e.g. designed or architected) in structure and content as a request for the switch device 1 to identify terminal devices connected to the switch device 1 that are to be monitored by the first computer device 9 based on the application initiated via the first and second messages. In some embodiments, the third message may be configured to set a requested device category (e.g. requestedDeviceCategory) set to "other" or another pre-defined setting to have the switch device 1 associate each implicit device monitor with the communication link of the first computer device 9 connection and the application session started based on the first and/or second messages. The third message can be configured in structure and content such that it can allow a single service request to be sent to the switch device 1 to obtain an identification of all devices associated with the application or service of the first computer device 9 that are to be monitored.

In response to the third message, the switch device 1 can send an acknowledgement message, such as a fourth message configured as a get switching function devices response. The fourth message can be configured to positively acknowledge receipt of the request of the third message and to acknowledge that at least one implicit device monitor has been configured based on the exchanged first and second messages. The switch device can then send a fifth message that includes a listing of all of the devices to be monitored by the first computer device 9. The listed devices can include all the terminal device identifications that are associated with the application associated with the first computer device 9 and the started applications session initiated via the first and second messages. The switch device 1 can also be configured to use the listed device identifications as an associated cross-reference identifier (e.g. a crossRefIdentifier) that will be sent in subsequent events.

In some embodiments, the content of the fourth and fifth messages may all be included within a single fourth message that is configured in structure and content to provide the acknowledgement to the first computer device 9 as well as providing the listing of devices to be monitored. In yet other embodiments, the acknowledgement of the fourth message may not be made and the content and structure of the fifth message may be sent as a single fourth message to both acknowledge receipt of the third message and provide the listing of requested devices in a single response message. Such types of fourth messages can permit the switch device 1 to send a single response to the first computer device's third message that includes a complete list of the devices to be monitored that is associated with the application or service initiated via the first and second messages. The list of devices can be used by the first computer device 9 to identify its associated devices and can also be used by the switch device 1 to provide monitor cross-reference identification in subsequent call control events involving one or more of the monitored devices that it may communicate to the first computer device 9.

The listing of devices provided by the switch device 1 to identify all the terminal devices to be monitored by the first computer device 9 can be a listing that is configured to identify each of the terminal devices to be monitored in a number of different formats or structures. For instance, each device can be identified by an address such as a phone number or internet protocol address. As another example, each device can be identified by another type of identifier such as an identifier that is created by use of a pre-selecting identification format.

In response to a receipt of the listing of devices to be monitored from the switch device 1, the first computer device 9 can initiate monitoring by sending a monitor start message to the switch device 1 for monitoring of the terminal devices identified by the switch device in response to the fourth message or fifth message sent by the switch device that includes the listing of all the terminal devices to be monitored by the first computer device. The monitoring may be performed by the first computer device 9 via communications with the switch device 1 such that the terminal devices are unaware of the monitoring being performed by the first computer device 9. The monitor start message can be configured in structure and content to communicate a pre-selected or pre-defined identification that is to inform the switch device 1 that it is to activate device monitors for monitoring of all the terminal devices listed in its response to the third message. The monitor start message can therefore be configured as a bulk start monitor request that is configured in content and structure to initiate the starting of monitors for all the devices in a single message sent to the switch device 1. The identification of devices to be monitored in the monitor start message can be via a listing of the devices the switch device 1 provided to the first computer device 9 or can be by use of a pre-selected reference identifier that is configured to identify all of these devices to the switch device or can be by another type of structure and content of the monitor start message.

The monitor start message can also include a filter identifier to identify the types of events that are to be monitored. Those events can range from any event that may involve the terminal devices to be monitored or a filter that only requires communications to the first computer device 9 when a particular type of call event or other pre-selected types of call events or communication events are detected as involving one or more of the terminal devices to be monitored by the first computer device 9.

In response to the monitor start message, the switch device can initiate the monitoring of the identified devices. The application linked to these devices via the exchanged first and second messages can allow the switch device 1 to filter the type of events that the switch device 1 identifies to the first computer device 9 for facilitating monitoring of the terminal devices that are identified as being the devices to be monitored via the monitor start message. Additional filtering information included in the monitor start message may also be used by the switch device to filter what types of events require a monitoring message to be sent from the switch device 1 to the first computer device 9 for monitoring of the terminal devices.

The switch device 1 can also send an acknowledgement of the monitor start message to inform that first computer device 9 that the monitoring of the identified devices has been initiated by the switch device 1. The switch device 1 may then begin reporting event messages for those devices to the first computer device 9 to identify events associated with those terminal devices and the application or service those devices are using that is to be monitored by the first computer device 9. For instance, when the monitoring is started at the switch device 1 in response to the monitor start message, the CSTA event flow from the switch device 1 can be initiated for all the devices listed in the listing of all of the devices to be monitored by the first computer device 9 that the switch device 1 previously communicated to the first computer device 9 in the fourth or fifth message.

After initiation of the monitoring, the first computer device 9 can remove the active monitors at the switch device 1 to stop receiving event notifications. For instance, a monitor stop request can be sent to the switch device 1. The monitor stop request sent by the first computer device 9 can be configured in content and structure to identify all the devices to be monitored so that a single monitor stop request can be sent to the switch device 1 to initiate the stopping of the reporting of the events for all of these terminal devices.

In response to the monitor stop request, the switch device 1 may stop the reporting of events to the first computer device 9 for the terminal devices identified in the monitor stop request (e.g. the terminal devices associated with a cross reference identifier included in the monitor stop request) and thereafter confirm receipt of the monitor stop request in an acknowledgement of the monitor stop request that is sent to the first computer device 9.

The acknowledgment of the monitor stop request that is sent by the switch device 1 can include a different identifier then the identifier included in the monitor stop request message that is sent by the first computer device 9 to identify the devices that the switch device 1 will no longer be sending report events for in response to the monitor stop request. For example, a cross reference identifier (e.g. an xref identifier) that may be used in the monitor stop request message sent by the first computer device 9 can differ from the cross reference identifier used in the acknowledgement message sent by the switch device 1. The first computer device 9 may have data within its memory to allow it to cross reference the identifier included in the acknowledgement message sent by the switch device 1 with a listing of terminal devices to identify the terminal devices identified via that cross reference identifier. Likewise, data in memory that is accessible to the switch device 1 can include content that allows the switch device 1 to identify the terminal devices identified by the cross reference identifier included in the monitor stop request sent by the first computer device 9.

Embodiments of the communication system can also include a second computer device 10, which is shown in broken line in FIG. 1. The second computer device 10 can also be configured to be communicatively connected to the switch device via a second communication link established between the second computer device 10 and the switch device 1. The second computer device 10 can be configured to communicate with the switch device 1 to perform monitoring of functions of at least some of the terminal devices connected to the switch device (e.g. monitoring of a service being used by the terminal devices via the switch device). In some embodiments, the second computer device can be configured as a workstation, a CTI server computer device or other type of server computer device.

The second computer device 10 can communicate with the switch device 1 to initiate and perform monitoring of a service. The service monitored by the second computer device 10 can be a different service than the service monitored by the first computer device 9. In some embodiments, that different service may be associated with a different application than the service monitored by the first computer device 9.

Figure 5:
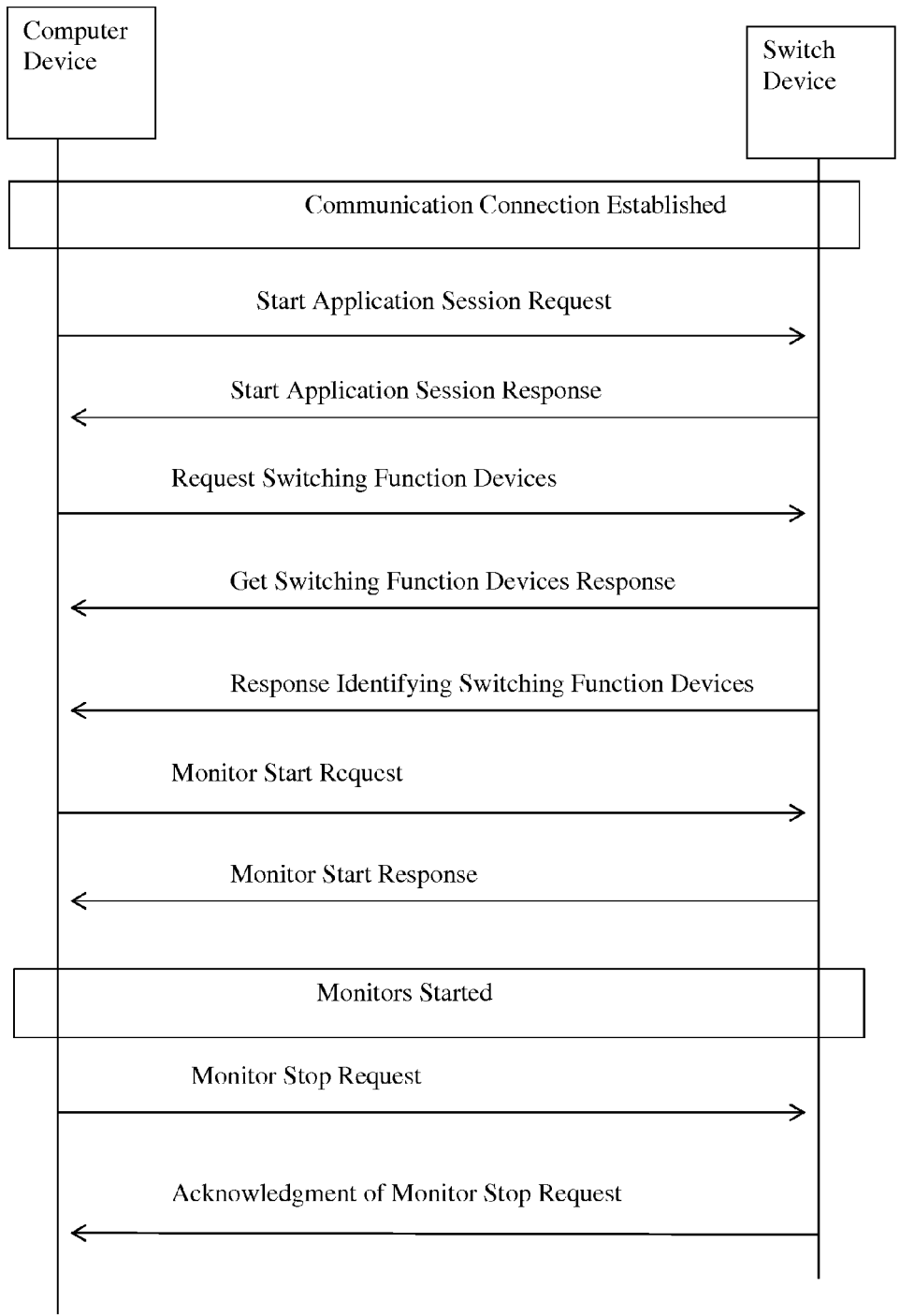
FIG. 5 is a schematic diagram illustrating communications that can be exchanged between the switch device and computer device of the exemplary embodiment of the communication system.

The second computer device 10 can be configured to utilize the same methodology that can be utilized by the first computer device 9 for communicating with the switch device 1 to initiate and performing monitoring of a service as illustrated in the exemplary methodology illustrated in FIG. 5. For example, the second computer device 10 can be configured to establish a communication connection with the switch device 1 to perform monitoring of terminal devices and functions of the network that the terminal devices may utilize via the switch device 1. After establishment of the communication link between the switch device 1 and the second computer device 10, the second computer device 10 and switch device 1 can exchange messages to start an application and subsequently initiate second computer device monitoring.

For instance, after a communication link is established, the second computer device 10 may send a first message to the switch device 1. The switch device 1 can send a response to that first message as a second message sent to the second computer device 10. The first and second messages can be designed or architected based on the Application Session protocol to configure the use of the Application Session protocol for the Application Session Services in compliance with CSTA standards. For example, the first message can be configured (e.g. designed or architected) as a start application session request. The second message can be configured (e.g. designed or architected) as a start application session response. The first message can be configured (e.g. designed or architected) such that the switch device associates a number of devices that utilize the switching device's resources with the application initiated via the first message sent by the second computer device 10. For example, the first message can provide information to the switch device 1 so that the switch device is able to identify the application to associate with the second computer device 10 and identify devices that can be associated with that application. The second message sent by the switch device 1 can be configured (e.g. designed or architected) to acknowledge receipt of that first message and indicate that it is able to associate device monitoring for the terminal devices associated with that application and the link established between the second computer device 10 and the switch device 1.

The second computer device 10 can respond to the second message it receives from the switch device 1. After receiving the second message, the second computer device 10 can send a third message that is configured as a get switching function device message, which can be configured (e.g. designed or architected) in structure and content as a request for the switch device 1 to identify terminal devices connected to the switch device 1 that are to be monitored by the second computer device 10 based on the application initiated via the first and second messages exchanged between the second computer device 10 and the switch device 1. In some embodiments, the third message may be configured to set a requested device category (e.g. requestedDeviceCategory) to "other" or another pre-defined setting to have the switch device 1 associate each implicit device monitor with the communication link of the second computer device 10 connection and the application session started via the first and second messages exchanged between the switch device 1 and the second computer device 10. The third message can be configured in structure and content such that it can allow a single service request to be sent to the switch device 1 to obtain an identification of all devices associated with the application of the second computer device 10 that are to be monitored.

In response to the third message, the switch device 1 can send an acknowledgement message, such as a fourth message configured as a get switching function devices response. The fourth message can be configured to positively acknowledge receipt of the request of the third message and to acknowledge that at least one implicit device monitor has been configured based on the exchanged first and second messages and can also include a listing of all of the devices to be monitored by the second computer device 10. The listed devices can include all the terminal device identifications that are associated with the application associated with the second computer device 10 and the started applications session initiated via the first and second messages. The fourth message can be configured in structure and content such that only a single fourth message is sent to the second computer device 10 to provide the acknowledgement to the second computer device 10 as well as providing the listing of devices to be monitored. Such a fourth message can permit the switch device 1 to send a single response to the second computer device's third message that includes a complete list of the devices to be monitored that is associated with the application initiated via the first and second messages.

The list of devices can be used by the second computer device 10 to identify its associated devices and can also be used by the switch device 1 to provide monitor cross-reference identification in subsequent call control events involving one or more of the monitored devices that it may communicate to the second computer device 10. The switch device 1 can also be configured to use the listed device identifications as an associated cross-reference identifier (e.g. a crossRefIdentifier) that will be sent in subsequent events.

In some embodiments, the content of the fourth message may be split into an acknowledgement message to acknowledge receipt of the request issued in the third message and a fifth message that provides a listing of all of the devices to be monitored. For example, the switch device may send a fourth message that is an acknowledgement of receiving the request issued in the third message received from the second computer device 10 and can subsequently send a fifth message that provides a complete listing of devices to be monitored in that fifth message so that only a single message is sent to the second computer device 10 to identify all the devices to be monitored in response to a single message sent by the second computer device 10 to have such devices identified to the second computer device 10.

The listing of devices provided by the switch device 1 to identify all the terminal devices to be monitored by the second computer device 10 can be a listing that is configured to identify each of the terminal devices to be monitored in a number of different formats or structures. For instance, each device can be identified by an address such as a phone number or internet protocol address. As another example, each device can be identified by another type of identifier such as an identifier that is created by use of a pre-selecting identification format.

In response to a receipt of the listing of devices to be monitored from the switch de vice 1, the second computer device 10 can send a monitor start message to initiate monitoring of the terminal devices identified by the switch device 1 in response to the third message. The monitoring may be performed by the second computer device 10 via communications with the switch device 1 such that the terminal devices are unaware of the monitoring being performed by the second computer device 10. The monitor start message can be configured in structure and content to communicate a pre-selected or pre-defined identification that is to inform the switch device 1 that it is to start communications for reporting of events for all the terminal devices listed in its response to the third message sent by the second computer device 10. The monitor start message can therefore be configured as a bulk start monitor request that is configured in content and structure to initiate the starting of monitors for all the devices in a single message sent by the second computer device 10 to the switch device 1. The identification of devices to be monitored in the monitor start message can be made via a listing of the devices the switch device 1 provided to the second computer device 10 or can be effected via use of a pre-selected reference identifier that is configured to identify all of these devices to the switch device 1 or can be by another type of structure and content of the monitor start message configured to identify all of the devices to be monitored by the second computer device 10.

The monitor start message can also include a filter identifier to identify the types of events that are to be monitored. Those events can range from any event that may involve the terminal devices to be monitored or a filter that only requires communications to the second computer device when a particular type of call event or other pre-selected type of call events or communication events are detected as involving one or more of the terminal devices to be monitored by the second computer device 10.

In response to the monitor start message sent by the second computer device 10, the switch device 1 can initiate the reporting of events for all of the identified terminal devices to the second computer device 10. The application linked to these devices via the exchanged first and second messages can allow the switch device 1 to filter the type of events that the switch device 1 identifies to the second computer device 10 for facilitating monitoring of the terminal devices that are identified as being the devices to be monitored via the monitor start message. The switch device 1 can also send an acknowledgement of the monitor start message to inform the second computer device 10 that the monitoring of the identified devices has been initiated by the switch device 1. The switch device 1 may then begin reporting event messages for those devices to the second computer device 10 to identify events associated with the terminal devices being monitored and the application or service those devices are using that is to be monitored by the second computer device 10. For instance, when the monitoring is started at the switch device 1 in response to the monitor start message, the CSTA event flow from the switch device 1 can be initiated for all the devices listed in the listing of all of the devices to be monitored by the second computer device 10 that the switch device 1 previously communicated to the second computer device 10 in the fourth or fifth message it sent to the second computer device 10 in response to the third message sent by the second computer device 10.

After initiation of the monitoring, the second computer device 10 can remove the active monitors at the switch device 1 to stop receiving event notifications. For instance, the second computer device 10 can send a monitor stop request to the switch device 1. The switch device 1 may then stop the reporting of events for all of the devices identified in the stop request (e.g. terminal devices listed in the monitor stop request or terminal devices identified via a cross reference identifier included in the monitor stop request) and thereafter confirm receipt of the monitor stop request in an acknowledgement of the monitor stop request that is sent to the second computer device 10. The monitor stop request sent by the second computer device 10 can be configured in content and structure to identify all the devices to be monitored so that a single monitor stop request can be sent to the switch device 1 to initiate the stopping of the reporting of events to the second computer device 10 for all of these terminal devices.

The acknowledgement of the monitor stop request that is sent by the switch device 1 to the second computer device 10 can include a different identifier than the identifier included in the monitor stop request message sent by the second computer device 10 to identify the terminal devices that the switch device 1 will no longer be sending report events for in response to the monitor stop request.

For instance, a cross reference identifier (e.g. an xref identifier) may be used in the monitor stop request message sent by the second computer device 10 that can differ from the cross reference identifier used in the acknowledgement message sent by the switch device 1. The second computer device 10 may have data within its memory to allow it to cross reference the identifier included in the acknowledgment message sent by the switch device 1 with a listing of terminal devices to identify the terminal devices identified via that identifier. Likewise, data in memory that is accessible to the switch device 1 can include content that allows the switch device 1 to identify the terminal devices identified by the identifier included in the monitor stop request sent by the second computer device 10.

It should be appreciated that embodiments of the communication system and method of making and using the communication system can be modified to meet different sets of design criteria. For instance, the organization and structure of the network 2 in which the switch device 1 is positioned can be any type of suitable structure and organization. As another example, the first computer device 9 and/or second computer device 10 can be positioned in the network of the switch device 1 or may be positioned in a network that is remote to this network 2 or is external to the network 2. As yet another example, some embodiments of the communication system may utilize only one computer device to perform monitoring of one or more services or may utilize multiple computer devices that each monitor a respective service (e.g. at least two computer devices that each monitor a respective service, at least three computer devices that each monitor a respective service, etc.). As yet another example, the application initiated via the application start messaging sent by the first computer device 9 and the service monitored by the first computer device 9 can be related to a CSTA application, can be a CSTA related service, or other type of service. As yet another example, the service monitored by the second computer device 10 can be related to a CSTA application, can be a CSTA related service, or other type of service. As yet another example, the terminal devices connected to the switch device 1 for use of one or more services can all be within the network 2, or only some of these terminal devices may be within the network 2 while others are external to the network 2 and remotely connect to the switch device 1. In yet other embodiments, all the terminal devices may be connected to the switch device 1 via at least one intermediate network. As yet another example, the communications exchanged between the computer devices and switch device may be configured to facilitate encryption, authentication, or otherwise be organized or configured to provide additional levels of security to the exchanged communications.

While certain exemplary embodiments of the communication system and methods of making and using the same have been shown and described above, it is to be distinctly understood that the invention is not limited thereto but may be otherwise variously embodied and practiced within the scope of the following claims.

What is claimed is:
1. A method of monitoring terminal devices comprising:
   sending a first message from a first computer device to a switch device after a first communication link is established between the first computer device and the switch device, the first message being configured to start an application session;
   sending a second message from the switch device to the first computer device in response to the first message;
   sending a third message from the first computer device to the switch device after receipt of the second message, the third message requesting an identification of all terminal devices of users connected to the switch device that is to be monitored by the first computer device;

sending a fourth message from the switch device to the first computer device in response to the third message, the fourth message being configured as a single message that identifies a list of all the terminal devices that the first computer device is to monitor, the list of all the terminal devices that the first computer device is to monitor identifying a plurality of terminal devices connected to the switch device;

sending a single monitor start message from the first computer device to the switch device in response to the fourth message to initiate device monitoring for all the terminal devices identified in the list of all the terminals that the first computer device is to monitor of the fourth message; and activating device monitoring for all of the terminal devices identified in the fourth message at the switch device in response to the single monitor start message such that call control events involving any of the terminal devices identified in the list of terminal devices that are to be monitored by the first computer device identified in the fourth message are communicated by the switch device to the first computer device after an acknowledgment of the single monitor start message is sent to the first computer device.

2. The method of claim 1, comprising:
upon a determination that a call event has occurred for at least one of the terminal devices being monitored by the activated device monitoring, sending a call control event for the at least one terminal device from the switch device to the first computer device.

3. The method of claim 2, comprising:
associating the activated device monitors with the first computer device, by the switch device, based on the application or service identified in the first message.

4. The method of claim 1, wherein the first computer device is a computer telephony integration server computer device.

5. The method of claim 1, wherein the switch device is a private branch exchange.

6. The method of claim 1, comprising:
sending an application start message from a second computer device to the switch device after a second communication link is established between the second computer device and the switch device;
sending an application start response message from the switch device to the second computer device in response to the first message;
sending a request for switching function devices message from the second computer device to the switch device after receipt of the application start response message, the request for switching function devices message requesting an identification of all terminal devices of users connected to the switch device that is to be monitored by the second computer device;
sending a single message identifying all the terminal devices to be monitored by the second computer device from the switch device to the second computer device in response to the request for switching function devices message,
sending a monitor start message from the second computer device to the switch device in response to the single message identifying all the terminal devices to be monitored by the second computer device to initiate device monitoring for all the terminal devices identified in the single message identifying all the terminal devices to be monitored by the second computer device; and activating device monitoring of all the terminal devices to be monitored by the second computer device at the switch device such that call control events involving any of these terminal devices are communicated by the switch device to the second computer device in response to the single monitor start message received from the second computer device.

7. The method of claim 1, comprising:
sending a single stop message from the first computer device to the switch device to stop device monitoring of all the terminal devices associated with the service.

8. The method of claim 7, comprising:
stopping device monitoring for all the terminal devices associated with the service at the switch device in response to receipt of the single stop message sent by the first computer device.

9. The method of claim 1, comprising:
upon a determination that a call event has occurred for at least one of the terminal devices being monitored by the activated device monitoring, sending a call control event for the at least one terminal from the switch device to the first computer device; and
sending a single stop message from the first computer device to the switch device to stop device monitoring of all the terminal devices associated with the service.

10. The method of claim 9, comprising:
stopping device monitoring for all the terminal devices associated with the service at the switch device in response to receipt of the single stop message sent by the first computer device.

11. A communication system comprising:
a switch device configured to be communicatively connectable to a plurality of terminal devices;
a first computer device communicatively connectable to the switch device via a first communication link, the first computer device having hardware, the hardware comprising non-transitory memory connected to a processor; and
the first computer device configured to initiate monitoring of a service provided to at least some of the terminal devices connectable to the switch device via a service request that is configured to occur in connection with an exchange of messages between the first computer device and the switch device, the exchange of messages comprising:
the first computer device sending a first message to the switch device after the first communication link is established, the first message being configured to start an application session;
the switch device sending a second message to the first computer device in response to the first message;
the first computer device sending a third message to the switch device after receipt of the second message, the third message requesting an identification of all terminal devices of users connected to the switch device that is to be monitored by the first computer device;
the switch device sending a fourth message to the first computer device in response to the third message, the fourth message being configured as a single message that identifies a list of all the terminal devices that the first computer device is to monitor, the list identifying a plurality of terminal devices;
the first computer device sending a single monitor start message to the switch device in response to the fourth message to initiate device monitoring for all the terminal devices that the first computer device is to monitor that was identified in the fourth message; and the switch device acknowledging the single monitor start message such that device monitoring of all the terminal devices to be monitored by the first computer device identified in the fourth message is activated at the switch device in response to the single monitor start message such that call control events involving any of the terminal devices that the first computer device is to monitor identified in the fourth message are communicated by the switch device to the first computer device after the acknowledging of the monitor start message is sent to the first computer device.

12. The communication system of claim 11, wherein the switch device is configured to send call control events to the first computer device for the terminal devices monitored via the initiated device monitoring.

13. The communication system of claim 11, wherein the first computer device is configured to send a single stop message to the switch device to stop device monitoring of all the terminal devices associated with the service.

14. The communication system of claim 13, wherein the switch device is configured to stop device monitoring for all the terminal devices associated with the service to be monitored in response to receipt of the single stop message sent by the first computer device.

15. The communication system of claim 11, wherein the switch device is configured to initiate device monitoring for all of these terminal devices identified in the fourth message for communicating call control events relating to these terminal devices to the first computer device in response to the single monitor start message.

16. The communication system of claim 11, wherein the switch device associates the device monitors with the first computer device based on the application or service identified in the first message.

17. The communication system of claim 11, wherein the switch device is configured to associate the first communication link with the device monitors activated in response to the monitor start message based on the first message.

18. The communication system of claim 11, wherein the first computer device is a computer telephony integration server computer device.

19. The communication system of claim 11, comprising:
a second computer device communicatively connectable to the switch device via a second communication link established between the second computer device and the switch device, the second computer device configured to initiate monitoring of a service provided to at least some of the terminal devices connectable to the switch device via a service request that is sent to the switch device to initiate device monitoring at the switch device for monitoring the terminal devices associated with the service to be monitored by the second computer device;

wherein the initiation of monitoring of the service provided to at least some of the terminal devices connectable to the switch device via the service request sent by the second computer device is configured to occur in connection with an exchange of messages between the second computer device and the switch device that comprise:
the second computer device sending a first message to the switch device after the second communication link is established, the first message being configured to start an application session;
the switch device sending a second message to the second computer device in response to the first message;
the second computer device sending a third message to the switch device after receipt of the second message, the third message requesting an identification of all terminal devices of users connected to the switch device that is to be monitored by the second computer device;
the switch device sending a fourth message to the second computer device in response to the third message, the fourth message being configured as a single message that identifies a list of all the terminal devices that the second computer device is to monitor;
the second computer device sending a monitor start message to the switch device in response to the fourth message to initiate device monitoring for all the terminal devices identified in the fourth message; and
the switch device acknowledging the monitor start message, device monitoring of all the terminal devices identified in the fourth message sent to the second computer device being activated at the switch device such that call control events involving any of these terminal devices are communicated by the switch device to the second computer device after the acknowledging of the monitor start message is sent from the switch device to the second computer device.

20. The communication system of claim 19, wherein the monitor start message sent by the second computer device is a single monitor start message.

* * * * *